UNITED STATES PATENT OFFICE.

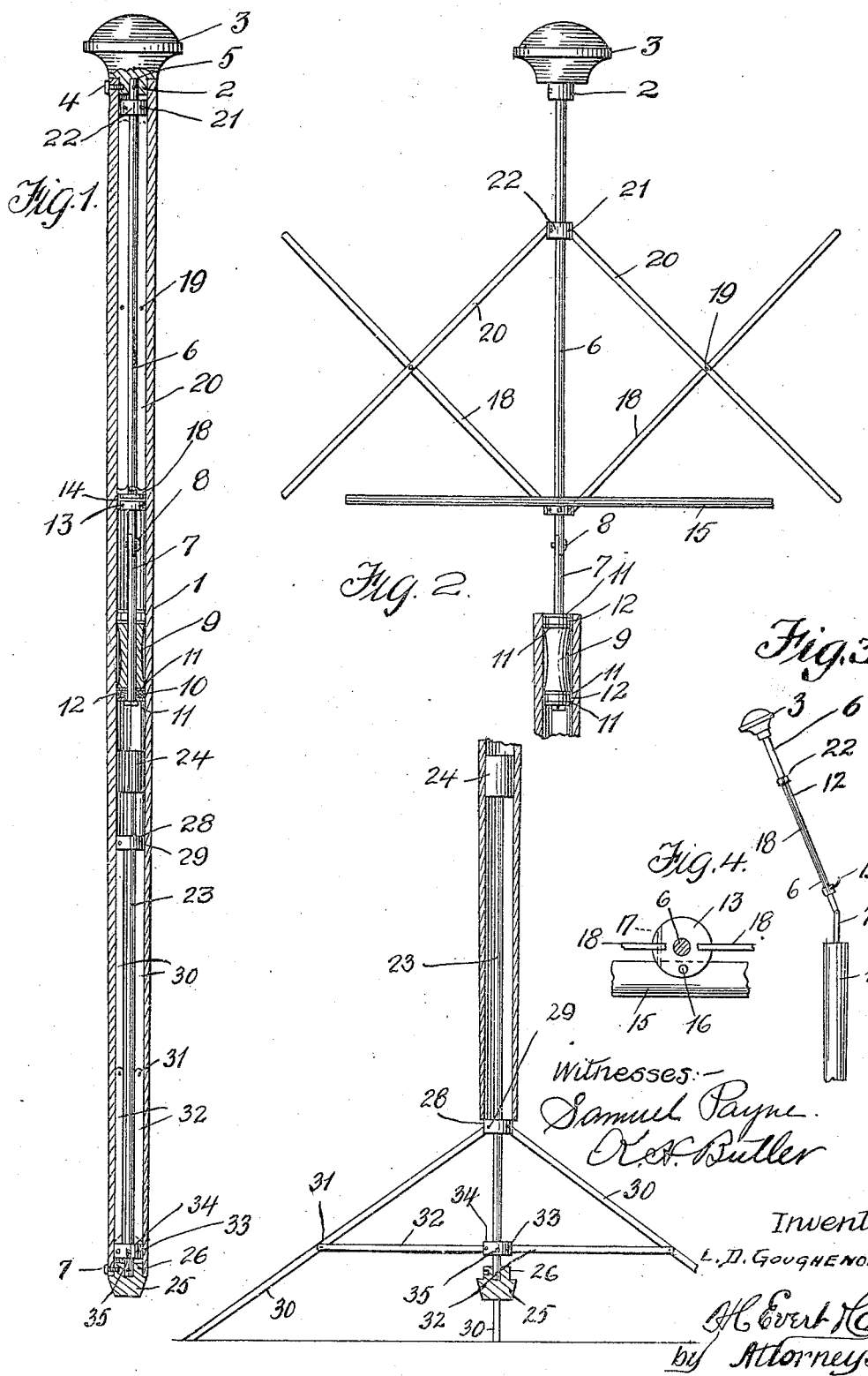

LEVI D. GOUGHENOUR, OF SCOTTDALE, PENNSYLVANIA.

COMBINED FOLDING MUSIC-RACK AND CANE.

956,336.  Specification of Letters Patent.  Patented Apr. 26, 1910.

Application filed October 27, 1909. Serial No. 524,859.

*To all whom it may concern:*

Be it known that I, LEVI D. GOUGHENOUR, a citizen of the United States of America, residing at Scottdale, in the county of Westmoreland and State of Pennsylvania, have invented certain new and useful Improvements in Combined Folding Music-Racks and Canes, of which the following is a specification, reference being had therein to the accompanying drawing.

This invention relates to a combined music rack and cane, and the primary object of my invention is to provide a music rack that can be easily folded and placed in a casing and the casing used as a cane.

Another object of this invention is to provide a novel music rack that can be advantageously used by musicians, particularly orchestra men, the rack being quickly set up and adjusted to support a piece of music at a desired elevation and inclination.

A further object of this invention is to provide an article of the above class that will be simple in construction, durable, inexpensive to manufacture, and highly efficient for the purposes, for which it is intended.

With these and such other objects in view as may hereinafter appear, the invention consists of the novel construction, combination and arrangement of parts to be hereinafter specifically described and then claimed.

In the drawing: Figure 1 is a vertical sectional view of the combined music rack and cane, showing the rack in a folded position. Fig. 2 is a vertical sectional view of the same, partly broken away and partly in elevation, showing the rack in a set up position. Fig. 3 is a side elevation of a portion of the rack, and Fig. 4 is a plan of a part of the rack.

In the accompanying drawings, the reference numeral 1 denotes a tubular casing for the music rack, said casing constituting the body of the cane. Adapted to fit in the upper end of the casing 1 is a depending shank 2 of a handle or knob 3 and said shank is secured in the upper end of the casing by a set screw 4. Attached to the shank 2 by means of a pin 5 or other fastening means is a rack rod 6 having the lower end thereof pivotally connected to a supporting rod 7, said rack rod being adjustable relative to the supporting rod 7 by means of a set screw 8, which permits of the rack rod 6 being positioned at an inclination relative to the supporting rod 7 and retained at the inclination by the set screw 8. Upon the lower end of the supporting rod 7 is mounted a piston body 9, piston rings 10, piston washers 11, and resilient rings 12, said rings being arranged between the washers 11 and encircling the rings 10. These resilient rings are adapted to frictionally engage the inner walls of the casing 1.

The lower end of the rack rod 6 is provided with a fixed head 13 and the front side of said head is provided with a horizontal slot 14 adapted to receive a ledge 15, which is slightly curved and can be held in engagement with the head 13 if desired by a pin 16. Pivotally connected to the head 13 by pins 17 or other fastening means are lower rack arms 18 and said arms are pivotally connected, as at 19, to upper rack arms 20, pivotally connected, as at 21, to a head 22 slidably mounted upon the rack rod 6.

Movably mounted in the casing 1 is a tripod rod 23 having the upper end thereof provided with a piston head 24 adapted to frictionally engage the inner walls of the casing 1, while the lower end of said rod is provided with a fixed tip 25 having a shank 26 adapted to fit in the lower end of the casing 1 and be held therein by a set screw 27. Slidably mounted upon the rod 23 is a head 28 and pivotally connected to said head, as at 29, are tripod legs 30. These legs are pivotally connected, as at 31, to stretchers 32 which are pivotally connected, as at 33, to a head 34 fixed upon the rod 23, as at 35.

In order that the manner of setting up the music rack can be fully understood reference will be had to Fig. 1 showing the rack folded in the cane casing 1. By removing the set screws 4 and 27 the shanks 2 and 26 can be released relative to the casing 1. It is then only necessary to pull upwardly upon the knob or handle 3 until the pivoted ends of the rods 6 and 7 clear the upper end of the casing 1. It is preferable to carry the ledge 15 in the casing 1 between the sets of rack arms 18 and 20, since these arms are diametrically opposed and sufficient space exists in the casing between the arms to accommodate the ledge 15 which is curved to easily fit in said casing. When pulling upwardly upon the rod 6 the ledge 15 will be freed and can immediately be placed in the horizontal slot 14 of the head 13. The arms 18 and 20 can then be swung outwardly to the position shown in Fig. 2. By pulling downwardly upon the tip 25 the tripod rod 23 can be lowered until the legs 30 are free of the casing 1. It will be noted that when the legs are folded the stretchers 32 lie parallel with the lower ends of the legs 30 within the casing 1.

It is through the medium of the set screw 8 that the rack can be placed at an inclination relative to the supporting rod 7, as shown in Fig. 3 and sufficient friction exists between the piston heads to maintain the tripod rod 23 and the supporting rod 7 in their adjusted position.

It will be observed that the casing 1 forms the standard or body of the rack when the rack is in use and when the rack is folded it forms an inclosure or casing for the rack and can be carried similar to a cane. Various kinds of material can be used in making the casing 1 and the knob 3, but it is preferable to make the remaining parts of light and durable metal.

Having now described my invention, what I claim as new is:—

1. In combination, a tubular casing, a shiftable rack rod mounted in the upper portion of said casing, a foldable rack connected to said rod and adapted when the latter is partially withdrawn from the casing to be extended, means carried by the upper end of the rod for closing the upper end of the casing when the rod is positioned wholly within the casing, a piston carried by the lower end of the rack rod, a tripod rod mounted in the lower portion of said casing, a foldable tripod carried by the tripod rod and adapted when said rod is partially withdrawn from said casing to be extended to constitute a support for maintaining the casing in a vertical position, means carried by the lower end of the tripod rod for closing the lower end of the casing when the rod is within the casing, and a piston carried by the inner end of the tripod rod.

2. In combination, a tubular casing, open at each end, a shiftable rack rod mounted in the upper end of said casing and capable of being withdrawn therefrom, a handle carried by the rack rod and adapted to extend in the upper end of the casing for closing it when the rod is wholly within the casing, releasable means for fixedly securing the handle to the upper end of the casing to prevent shifting of the rack rod, a foldable rack carried by said rod and adapted to be extended when the rod is partially withdrawn from the casing, a piston carried on the inner end of said rod and engaging the inner end of the casing, a tripod rod mounted in the lower portion of said casing and capable of being withdrawn therefrom, a tip carried by the tripod rod and adapted to extend in the lower end of the casing for closing it when the tripod rod is wholly within said casing, releasable means for fixedly securing the tip to the casing to prevent shifting of the tripod rod, a foldable tripod carried by the tripod rod and adapted when said rod is partially withdrawn to be extended for supporting the casing in a vertical position, and a piston carried by the inner end of said tripod rod.

In testimony whereof I affix my signature in the presence of two witnesses.

LEVI D. GOUGHENOUR.

Witnesses:
H. A. SHAFFER,
KARL H. BUTLER.